United States Patent [19]

Eckhardt et al.

[11] E Re. 29,583

[45] Reissued Mar. 21, 1978

[54] COMBINED RADIAL AXIAL BEARING

[76] Inventors: Hellmuth Eckhardt, Am Stasgen 6, 7512 Herzogerrath; Reiner Sauerbier, Sebastianusstrasse 11, 5102 Wuerselen, both of Germany

[21] Appl. No.: 681,443

[22] Filed: Apr. 29, 1976

Related U.S. Patent Documents

Reissue of:

[64] Patent No.: 3,809,444
Issued: May 7, 1974
Appl. No.: 314,931
Filed: Dec. 14, 1972

[30] Foreign Application Priority Data

Dec. 24, 1971 Germany ..... 2164551

[51] Int. Cl.[2] ..... F16C 19/04
[52] U.S. Cl. ..... 308/174
[58] Field of Search ..... 308/174, 213, 214, 217

[56] References Cited

U.S. PATENT DOCUMENTS

| | | | |
|---|---|---|---|
| 2,063,787 | 12/1936 | Brown | 308/174 |
| 2,404,084 | 7/1946 | Norton | 308/174 |
| 3,167,363 | 1/1965 | Murphy | 308/174 |
| 3,168,359 | 2/1965 | Murphy | 308/174 |
| 3,341,263 | 12/1967 | Pitner | 308/174 |
| 3,765,736 | 10/1973 | Pitner | 308/174 |

*Primary Examiner*—Richard A. Bertsch
*Attorney, Agent, or Firm*—Frank S. Troidl

[57] ABSTRACT

A combined radial axial roller or needle bearing with a drawn outer cup, in which the inner surface serves as a raceway for the roller bodies acting in radial direction and a part integrally formed with the cup and disposed generally normal of the cup serves as a support for the roller bodies acting in axial direction, said cup is formed pot-shaped, the inner surface of the bottom part serving as a support of the roller bodies acting in axial direction.

13 Claims, 7 Drawing Figures

COMBINED RADIAL AXIAL BEARING

Figure 1:
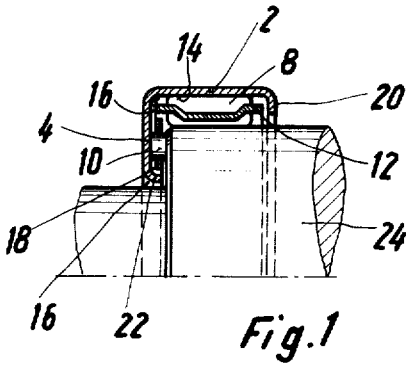

Matter enclosed in heavy brackets [ ] appears in the original patent but forms no part of this reissue specification; matter printed in italics indicates the additions made by reissue.

This invention relates to a combined radial axial roller or needle bearing including a drawn outer cup, in which the inner surface serves as a raceway for the roller bodies acting in radial direction and a part integrally formed with the cup and disposed generally normal of the cup axis serves as a support for the roller bodies acting in axial direction.

In conventional bearing of the specified type, the cup has at one end an outwardly directed circumferential annular flange which is disposed in a plane extending normal of the cup axis. The side of the annular flange remote from the cup in this regard serves as a raceway for the roller bodies of the axial bearing part. The axial bearing part comprises a cage provided with radially arranged needles which is inserted upon assembly of the bearing between a raceway provided at the workpiece, for instance a shaft shoulder, and the annular flange of the bearing cup.

This conventional bearing which in the non-assembled condition comprises at least two separate individual parts is admittingly suited to support shafts provided with shoulders, the radial bearing part engaging the shaft section having the smaller diameter. For radially and axially arresting smooth shaft ends or for mounting shafts having shoulders, in which the radial bearing part is supposed to engage the shaft portion having the larger diameter, the conventional bearing cannot be used.

The invention is based on the problem of providing a simple combined radial axial bearing easy to make which is suited to support stepless cylindrical end portions.

According to the invention this problem is solved in that the cup is made pot-shaped, the inner surface of the bottom portion serving as a support for the roller bodies acting in axial direction.

The bearing of this invention is particularly easy to assemble, since it merely has to be pushed onto the cylindrical ends prior to assembly of the machine part to be mounted. The bearing of this invention additionally has a very space saving design, so that for predetermined outer dimensions the machine part to be mounted can be dimensioned accordingly larger, which in the most instances represents a substantial advantage in view of higher strength, lesser deflection, etc.

Preferably in the bearing of this invention both the radial and the axial roller bodies are guided by cages. In order to in this regard inseparably connect the two bearing parts with the cup, the axial cage can grip behind the radial roller bodies, the outer diameter of the axial cage being larger than the diameter of the circle circumscribed within the radial roller bodies and the radially inward sides thereof. [In this regard the outer diameter of the axial cage can be a little smaller than the diameter of the radial roller bearing raceway and larger than the outer diameter of the radial cage, so that the radial cage is supported in axial direction against the axial cage.] The outer diameter of the axial cage [on the other hand also may be] *is* a little smaller than the inner diameter of the radial cage so that the radial cage is directly supported in axial direction of the inner surface of the bottom part of the cup.

The margin of the cup remote from the bottom part can be bent inwardly in order to also arrest the radial bearing part on the side remote from the bottom part. In this regard the inner diameter of the bent-over edge can be smaller than the outer diameter of the radial cage so that it engages the bent-over edge. The inner diameter of the bent-over edge can also be a little larger than the outer diameter of the radial cage, however, the bent-over edge is serving directly as an axial engagement for the radial roller bodies.

The inner surface of the bottom part of the cup can be directly used as a raceway for the axial roller bodies. If the bottom part of the cup for some reasons cannot be hardened or is not to be hardened, however, or in the event in case of case-hardened cups, the case layer is not sufficiently deep, in order to be able to accommodate the axial forces to be expected, also a disk loosely placed against the inner surface of the bottom part can be used as a raceway for the axial roller bodies, said disk appropriately being formed annular. The inner edge of the annular disk in this regard appropriately is bent inwardly generally rectangular and grips around the inner edge of the axial cage, so that the disk and the axial cage are centered relative to one another. Furthermore, the outer edge of the disk can be centered by the radial inner surface of the cup.

In the event the bearing of this invention is to be used at a shaft shoulder or some other machine part is to axially extend through the bearing center, the bottom part of the cup can have a centrically disposed circular recess. In this regard the end of the recess can be bent inwardly in order to center the axial cage and/or the disk serving as a raceway for the axial roller bodies.

The bearing of this invention is preferably suited for a mutual supporting of the differential carrier of an axle differential for automotive vehicles. In this application example in particular, the space saving design of the bearing of this invention is advantageously notable in relationship to the tapered roller bearings used up to now, since now the bearing ends of the differential carrier can be reinforced, thereby a lesser deflection and thus a lesser tooth wear being able to be accomplished. Finally by application of the bearing of this invention a radial clearance can be adjusted, which serves to muffle the rear axle noise.

Figure 6:
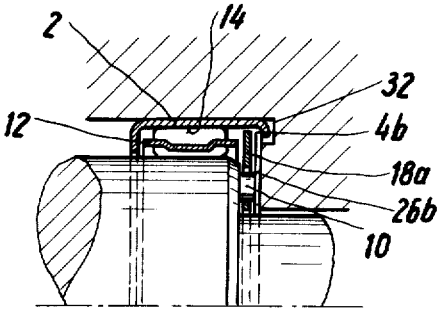
Figure 7:
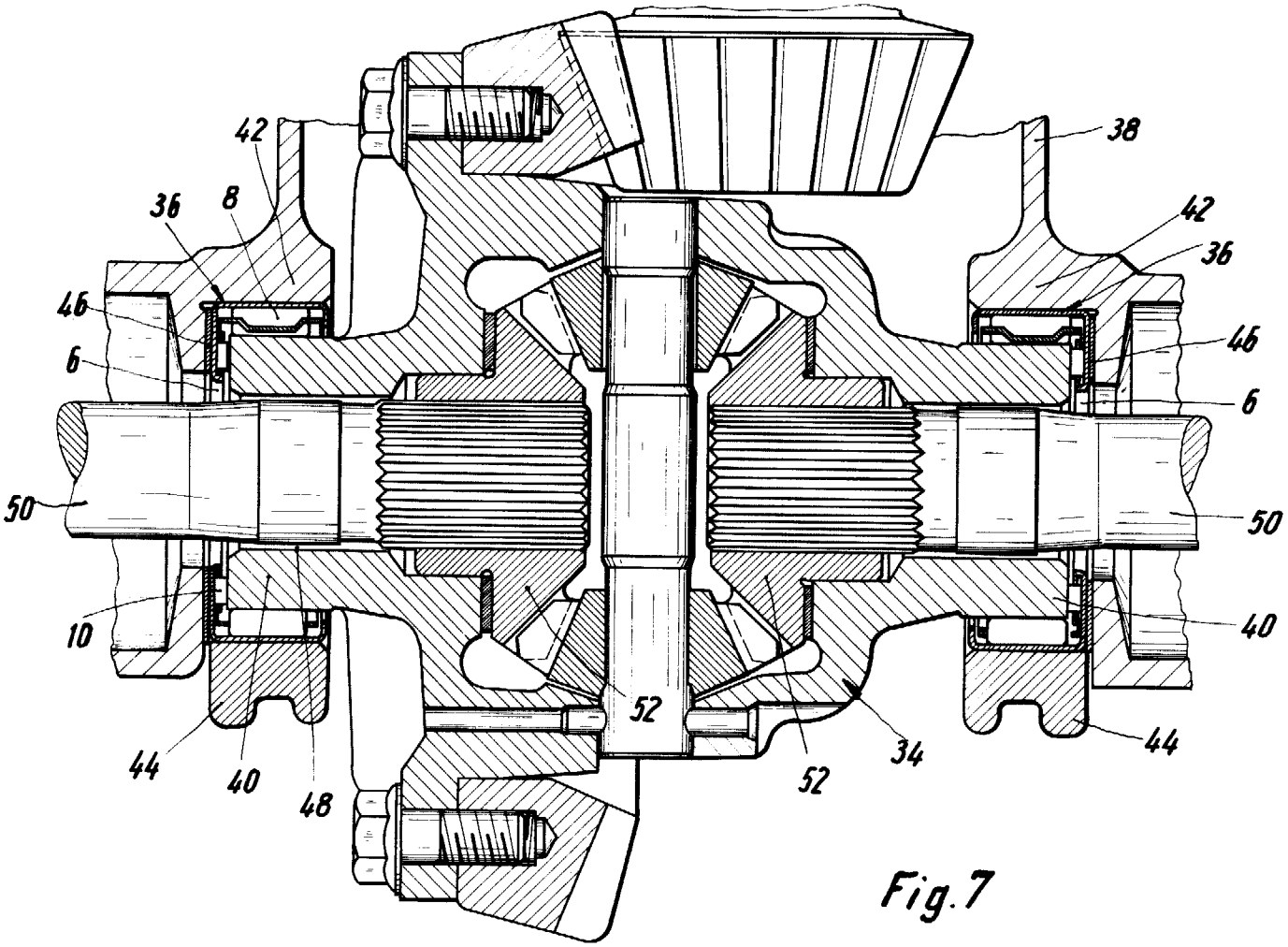

The invention has been illustrated in the drawing by way of example and is described hereinafter in detail in referring to the drawing. Therein:

FIGS. 1 to 6 are illustrations of various embodiments of the bearing of this invention and FIG. 7 is an assembly example for the bearing of this invention.

According to FIG. 1 the combined radial axial bearing of this invention has a pot-shaped drawn cup 2, the bottom part 4 of which extending normal of the cup axis has a centrical circular recess 6. Two sets of differently large needles or rollers 8 and 10 are provided as roller bodies, which act in radial or axial direction.

For the radial roller bodies 8 which are guided by a radial cage 12, the cylindrical inner surface 14 of the cup 2 serves as an outer raceway. The inside surface 16 of the bottom part 4 serves as an axial raceway with which the axial roller bodies 10 seated in an axial cage 18 engage.

The end of the cup 2 remote from the bottom part 4 has an inwardly bent margin 20, the inner diameter of which is smaller than the outer diameter of the radial cage 12.

The radial cage 12 thus is arrested in axial direction with an according clearance on the one side the inner surface of the bent around margin 20 and on the other side the inner surface 14 of the bottom part 4 serving as a confinement.

The axial cage 18 has an outer diameter which is a little smaller than the inner diameter of the radial cage 12 *so the axial cage 18 cannot contact the radial cage 12,* and larger than the diameter of the circle circumscribed within the radial roller bodies 8 at the sides thereof disposed radially inwardly. The axial cage 18 consequently grips behind the radial roller bodies 8 and thereby is arrested therebehind, so that it is retained unlosably in the bearing together with the axial roller bodies 10. The recess 6 provided in the bottom part 4 has an inwardly bent margin 22 which grips behind the inner margin of the axial cage 18 for centering the axial cage 18.

The embodiment of the bearing of this invention illustrated in FIG. 1 has been applied to a stepped shaft portion 24 for illustration purposes, the shaft portion provided with the larger diameter serving as an inner raceway for the radial roller bodies 8 and the face of the step serving as an inner raceway for the axial roller bodies 10. All raceways are preferably hardened.

Figure 2:
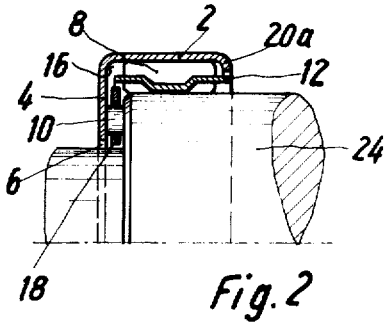

The embodiment illustrated in FIG. 2 broadly has the same features as the bearing according to FIG. 1. In this embodiment the cup 2 is made a little shorter. This feature is achieved by the fact that the bent around margin 20a which is provided at the end of the cup 2 remote from the bottom part 4 directly grips around the radial roller bodies 8. The inner diameter of the bent around margin 20a in this regard is larger than the outer diameter of the radial cage 12, so that it can extend through the internal diameter of the bent around margin 20a. The axial arresting of the radial cage 12 and thus the radial roller bodies 8 is effected on the side of the bottom part 4 in the same way as in the embodiment illustrated in FIG. 1 by engagement of the radial cage 12 with the inner surface 16 of the bottom part 4 and on the opposite side by engagement of the radial roller bodies 8 with the margin 20a bent inwardly.

The margin of the recess 6 provided in the pot-shaped part 4 is not bent around in this embodiment, rather *it* is disposed in a plane with the bottom part 4. The diameter of the recess 6 is made larger contrary to the embodiment illustrated in FIG. 1 than the inner diameter of the axial cage 18 which in this case in the built-in condition can be centered by the shaft part provided with the reduced diameter of the stepped shaft portion 24. Just like in the embodiment illustrated in FIG. 1, the outer diameter of the axial cage 18 is a little smaller than the inner diameter of the radial cage 12, but larger than the diameter of the circle circumscribed within the radial roller bodies 8 at the sides thereof disposed radially inwardly so that the axial cage 16 also is retained with the axial roller bodies 10 in the non-assembled condition in the bearing.

Figure 3:
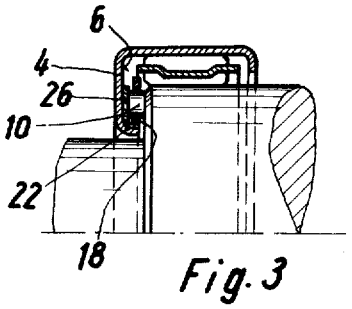

The embodiment illustrated in FIG. 3 essentially corresponds to the bearing according to FIG. 1. The only difference is that the axial roller bodies 10 do not directly roll on the inner surface of the bottom part 4, but that between the axial roller bodies 10 and the inner surface 16 of the bottom part 4, a hardened disk 26 is provided the surface of which facing the roller bodies serves as a raceway for the roller bodies. The disk 26 is formed annular and is centered by the margin 22 provided at the bottom part 4 and bent inwardly. The disk 26 can in this regard be formed completely planer, but also may have a margin 28 bent around at the inner side.

Figure 4:
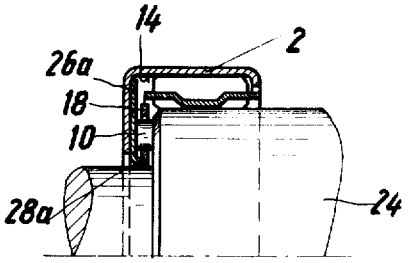

In the embodiment illustrated in FIG. 4, the cup 2 is formed in the same way as in the embodiment illustrated in FIG. 2. However, in the bearing according to FIG. 4, just like in the bearing according to FIG. 3, a disk 26 is provided serving as a raceway for the axial roller bodies 10. The disk 26a extends with its outer diameter to close to the inner surface 14 of the cup 2 and has a bent around margin 28a extending around the inner recess which grips behind the axial cage 18 inwardly and centers it.

Figure 5:
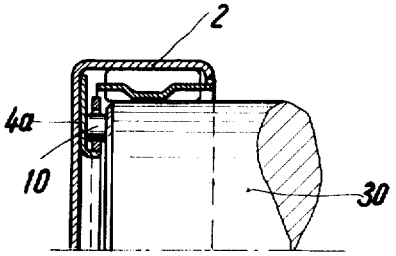

In the embodiment illustrated in FIG. 5, the bottom part 4a is formed closed, so that this embodiment only is suited to mount shaft ends 30. The axial roller bodies 10 in this regard engage the face of the shaft end 30. Such a bearing has the advantage that it is sealed outwardly, satisfactorily.

In the embodiment illustrated in FIG. 6, the bottom part 4b of the cup 2 has a recess extending to close to the cup circumference so that a narrow margin remains only as a bottom part 4b. A disk 26b extending from the inside up to the inner surface 14 of the cup 2 engages the marginal bottom part 4b, said disk serving as a raceway for the axial roller bodies 10. In the built-in condition the disk 26b engages a face of a structural member which instead of the bottom part of the cup takes over the supporting function of the disk 26b. For accommodating the marginal bottom part 4b projecting beyond the disk 26b in the face of the workpiece with which the disk 26b engages a circumferential groove 32 is provided.

The axial cage 18a in this embodiment extends to the inner surface 14 of the cup 2 and thus can be centered by it. At the same time the axial cage 18a serves as a confinement of the axial movement of the radial cage 12.

FIG. 7 shows an axial differential in which the differential carrier is mounted by means of two bearings 36 according to the invention in a housing 38. The bearing 36, which according to an embodiment may be provided with an open bottom are coupled to the cylindrical ends 40 of the differential carrier 34 prior to the assembly, the radial roller bodies 8 engaging the outer cylindrical surface of the ends 40 and the axial roller bodies 10 engaging the planer faces of the ends 40.

For assembling the differential carrier 34 it is inserted together with the applied bearings 36 laterally in bearing half shells 42, which are formed in the housing 38. For arresting the differential carrier, in continuation of the half shells 42 separate half shells 44 are bolted in complement from the opposite sides.

For adjusting the axial bias between the housing and the outer side of the bottom part 4 of the bearing, shims 46 are inserted the thickness of which is chosen according to the predetermined bias values.

After the assembly of the differential carrier from the sides, the axes 50 are inserted through the recesses 6 provided in the bottom part of the bearing and through the bores 48 provided in the cylindrical ends 40 of the differential carrier 34, which in the assembled condition with their splines provided in their ends, engage in according bevel gears 52 of the differential gear.

In the embodiment illustrated in FIG. 7, the bearing of this invention is usable in all those instances where hardened and ground stepped shoulders are to be mounted, for instance for mounting an intermediate shaft of skewed spur-gear transmissions, etc.

What is claimed is:

1. A combined radial and axial bearing comprising a drawn cup having integrally joined cylindrical and annular portions, said cylindrical portion having an inner surface defining a radial raceway, radial roller bearing bodies cooperating with said radial raceway, a radial cage aligned with said radial raceway and retaining said radial bodies in guided spaced relation, a radially inwardly directed generally annular flange on said cylindrical portion at the end thereof retaining said caged radial bodies [within] *with* said cup, axial roller bearing bodies associated with said annular portion, an axial cage aligned with said annular portion, and retaining said axial bodies in guided spaced relation, said radial cage projecting into axial overlapping relation relative to said axial bodies and said axial cage, and said axial cage being in radial overlapping relation relative to said radial bodies and having a maximum diameter *sufficiently* less than the maximum diameter of said radial cage with said radial bodies, *so that when the bearing is in use, the axial cage cannot contact the radial cage.*

2. The bearing of claim 1 wherein said bearing is mounted on a cylindrical end of a differential carrier and said cylindrical end is clamped within half shell portions of a differential housing with said annular portion axially engaging an annular seat of said housing.

3. The bearing of claim 1 wherein said annular portion has remote from said cylindrical portion an axially inwardly directed generally cylindrical flange retaining said axial cage in centered relation.

4. The bearing of claim 3 wherein said cylindrical flange is formed integrally with said annular portion.

5. The bearing of claim 4 wherein said cylindrical flange retains within said cup a hardened race forming annular insert, and said insert has an axially inwardly directed generally cylindrical flange directly retaining said axial cage in centered relation.

6. The bearing of claim 3 wherein said cylindrical flange is formed integrally with said annular portion as part of a hardened race forming annular insert retained by said annular portion.

7. The bearing of claim 3 wherein said annular flange extends radially inwardly beyond an outer portion of said radial cage for axial engagement by said radial cage.

8. The bearing of claim 1 wherein said annular flange extends radially inwardly beyond an outer portion of said radial cage for axial engagement by said radial cage.

9. The bearing of claim 1 together with an annular hardened insert disposed axially inwardly of said annular portion and forming a raceway for said axial bodies.

10. The bearing of claim 9 wherein said insert has at its inner diameter an axially inwardly directed flange for retaining said axial body and said axial cage.

11. The bearing of claim 10 wherein said annular flange steps radially outwardly of an outer portion of said radial cage for end engagement with said radial bodies.

12. The bearing of claim 9 wherein said annular flange steps radially outwardly of an outer portion of said radial cage for end engagement with said radial bodies.

13. The bearing of claim 1 wherein said annular flange steps radially outwardly of an outer portion of said radial cage for end engagement with said radial bodies.

* * * * *